(12) United States Patent
Hummel

(10) Patent No.: US 7,092,359 B2
(45) Date of Patent: Aug. 15, 2006

(54) METHOD FOR DISTRIBUTING THE DATA-TRAFFIC LOAD ON A COMMUNICATION NETWORK AND A COMMUNICATION NETWORK FOR IMPLEMENTING THIS METHOD

(75) Inventor: Heinrich Hummel, Gunding (DE)

(73) Assignee: Siemens AG, Munich (DE)

( * ) Notice: Subject to any disclaimer, the term of this patent is extended or adjusted under 35 U.S.C. 154(b) by 1238 days.

(21) Appl. No.: 09/800,420

(22) Filed: Mar. 5, 2001

(65) Prior Publication Data

US 2001/0043585 A1    Nov. 22, 2001

(30) Foreign Application Priority Data

Mar. 10, 2000 (DE) ................. 100 11 722

(51) Int. Cl.
*H04L 12/26* (2006.01)
(52) U.S. Cl. ........................... 370/238; 370/255
(58) Field of Classification Search ........ 370/230–238, 370/389, 391, 392, 395.1, 236, 252, 254–256
See application file for complete search history.

(56) References Cited

U.S. PATENT DOCUMENTS

| | | | |
|---|---|---|---|
| 5,042,027 A | | 8/1991 | Takase et al. |
| 5,453,980 A | * | 9/1995 | Van Engelshoven ... 370/395.53 |
| 5,467,345 A | | 11/1995 | Cutler, Jr. et al. |
| 5,495,479 A | * | 2/1996 | Galaand et al. ............ 370/404 |
| 5,675,582 A | * | 10/1997 | Hummel et al. ........... 370/255 |
| 6,195,336 B1 | * | 2/2001 | Stumer ...................... 370/238 |
| 6,201,804 B1 | * | 3/2001 | Kikinis ...................... 370/352 |

FOREIGN PATENT DOCUMENTS

EP    0 902 600 A2    9/1998

OTHER PUBLICATIONS

Distributed routing based on an estimated input traffic matrix Adibniya,F.; Computers and Communications, 1998. ISCC '98. Proceeding.*
Hummel, Heinrich, "Orchestrally conducted Traffic (OCT)." *TE Working Group*, Internet Draft: 1-7; Oct., 1999.
Wollman V. et al "Overview of open shortest path first, version 2 (OSPF V2) routing in the tactical environment" The Mitre Corporation, Edgartown, New Jersey pp. 925-930 Nov. 5,1995.
Villamizar, C. et al "OSPT Optimized Multipath" IETF Internet Draft pp. 1-38 Feb. 24, 1999.
Apostolopoulos, G. et al "Implementation and Performance Measurements of QoS Routing Extensions to OSPF" Eighteenth Annual Joint Conference of the IEEE Computer and Communications Societies pp. 680-688 Mar. 21, 1999.
Search Report Dated Jun. 25, 2003 in EP 01105051.

* cited by examiner

*Primary Examiner*—Hassan Kizou
*Assistant Examiner*—Salman Ahmed
(74) *Attorney, Agent, or Firm*—Fish & Richardson P.C.

(57) ABSTRACT

A method for distributing a data traffic load on a communication network with an extensive range of network nodes connected via a link line. The method includes ascertaining a current data transfer loading value for the link line or a network node using a data traffic monitoring system, determining and sending distribution information for the network node based on the current data transfer loading value using the data traffic monitoring system, generating an allocation model used to divide an address information of data packets into separate address classes assigned to alternative routes leading to a destination network node using the network node wherein each based on the distribution information, and ascertaining the address class from the address information and sending the data packets via one of the alternative routes assigned to the address class ascertained when the network node has received the data packet addressed to the destination network node.

12 Claims, 2 Drawing Sheets

METHOD FOR DISTRIBUTING THE DATA-TRAFFIC LOAD ON A COMMUNICATION NETWORK AND A COMMUNICATION NETWORK FOR IMPLEMENTING THIS METHOD

A method for distributing the data-traffic load on a communication network, and a communication network for implementing this method.

BACKGROUND OF THE INVENTION

In current communication networks, which comprise an extensive range of network nodes connected via link lines, data is often transmitted in data packets. In this type of configuration, the data packets are transferred from an originating network node, and then from network node to network node, until they arrive at the destination network node. Well-known transmission methods of this type include the so-called ATM method (asynchronous transfer mode), the so-called MPLS method (multiprotocol label switching), and methods based on the Internet protocol (IP).

There are generally a number of alternative routes for transmitting data packets from an originating network node to a destination network node. In each case, a suitable route must be selected from these alternatives for each data packet (or each stream of related data packets) to be transferred. In particular, this selection is based on the criterion of transmitting the data packets to the destination network node with a minimum of delay and a minimum of packet losses. In order to optimize the data-transfer performance of the overall communication network, the selection should also be based on the avoidance of transfer bottlenecks, i.e. the overloading of individual network nodes or link lines, where possible. This can be achieved by distributing the data-traffic load in the communication network as appropriate, although there is the problem of coordinating route selections made by individual network nodes, when distributing the data-traffic load across all network nodes.

The IETF (Internet engineering task force) Internet draft "draft-hummel-te-oct-00.txt" by Heinrich Hummel, dated October 1999, proposes the use of a central, data-traffic routing facility to distribute the data-traffic load. With central routing, coordination between all the network nodes would not be necessary in order to achieve optimum distribution of data traffic. The data-traffic routing facility sends probability details to each network node. With reference to each destination network node, these details specify the probability of selecting a particular route leading to this destination network node for a connection that is subsequently established. When the connection is subsequently established, the actual route to be used is selected using a random-number generator in accordance with the probability details that were sent.

However, the fixed assignment of connections to routes is evidently inflexible, particularly in the case of permanent connections with data-transfer speeds that fluctuate widely. Furthermore, if connections are established and shut down frequently, the permanent assignment of connections to routes results in high administration overheads for each network node concerned. This is particularly resource-intensive in the case of large communication networks linking many subordinate communication networks, e.g. large Service Provider networks, since it involves the management of very many end-to-end connections between a potentially very high number of terminal devices.

As an alternative, data packets could be distributed to the destination network node via the alternative routes without any reference to a connection assignment. However, the problem here is that, having followed different routes, the data packets do not normally arrive at the destination network node in their original transmission sequence. Reconstructing the original, connection-specific stream of data packets involves a considerable delay, since it is necessary to wait a relatively long time for each data packet to be transferred. Such delays are often not acceptable in real-time applications.

SUMMARY OF THE INVENTION

The object of the present invention is to define a method whereby the data-traffic load on a communication network can be distributed in a way that is flexible and has low overheads, and which largely preserves the connection-specific sequence of data packets. A further object is to define a communication network for implementing the inventive method.

This object is met by a method that has the characteristics of Patent claim 1 and a communication network that has the characteristics of Patent claim 13.

In order to achieve optimum distribution of the data-traffic load across the network nodes in a communication network, the inventive method ascertains the current data-transfer-loading values for link lines and/or network nodes in the communication network, by means of a data-traffic-monitoring system. Ideally, the data-transfer-loading values are ascertained for all link lines and/or network nodes in the communication system, and specify their respective loading, i.e. their remaining free transmission bandwidth in each case. Based on the data-transfer-loading values that have been ascertained, the data-traffic-monitoring system defines node-specific distribution information, preferably for each network node in the communication network, and sends it to the network node concerned. For each of the destination network nodes in the communication network that can be reached by an individual network node, the distribution information defined for this network node specifies how to distribute the data packets to be transferred to a given destination network node on the alternative routes leading to this destination network node. The distribution information sent to the individual network nodes is coordinated in such a way that transfer bottlenecks can be largely avoided throughout the communication network. Compared to a transfer strategy in which data streams are transferred over the route with the greatest remaining free transmission bandwidth in each case, distribution of the data-traffic load has the advantage that transfer bottlenecks are not simply moved to another route.

Depending on the distribution information it receives, a network node generates a allocation model, which is used to divide the address information of data packets awaiting transfer into separate address classes. The address information used as a basis for this allocation may be e.g. the source address of the data packet, a combination of the source address and one or more destination addresses of the data packet, or information in the data packet indicating assignment to a particular connection. Depending on the distribution information, the address information can be divided into address classes e.g. according to address range, according to the values of a so-called hash function applied to address information, or according to specified bit combinations of the address information. Each of the address classes is assigned to one of the alternative routes leading to the destination network node concerned. In order to transfer a data packet, its address information is extracted, the address class of the extracted address information is determined, and the data packet is sent over the route assigned to the specified address class.

Few overheads are required to extract the address information and determine the associated address class on the network node concerned. This nonetheless guarantees that data packets belonging to the same end-to-end connection, which generally contain the same address information, will be transferred over the same route. In this way, it is possible to largely avoid any change in the sequence of data packets belonging to the same end-to-end connection, on their way to the relevant destination network node.

An existing end-to-end connection can only be redirected to another route if the allocation model changes, e.g. due to a change in the network loading. Although this could result in short-term disruption of the sequence of data packets, such short-term disruptions are generally acceptable. In the case of connections with widely varying data rates, redirection of an existing connection to a new route is even beneficial in many cases, with regard to uniform loading of network resources.

Managing the assignments of all the end-to-end connections to routes, which is a very resource-intensive activity, is not necessary with the inventive method. This is particularly beneficial in the case of large communication networks linking many subordinate communication networks, where there may be is a very high number of end-to-end connections to manage between terminal devices in all the subordinate communication networks.

The invention is also largely independent of whether the data packets in the communication network are sent in connection-based or connectionless mode. This represents a significant advantage, particularly in communication networks with different levels of hierarchy or heterogeneous communication networks, where data packets are frequently sent in both connection-based and connectionless mode, depending on the section concerned.

Advantageous embodiments of the invention are specified in the dependent claims.

In accordance with an advantageous embodiment of the invention, the data-transfer-loading values can be ascertained using a routing protocol in the communication network, e.g. the PNNI routing protocol (private network-to-network interface) or the OSPF routing protocol (open shortest path first), preferably at regular time intervals.

Using the routing protocol, the data-traffic-monitoring system can also obtain the structure information required for data-traffic routing, e.g. information about the profile of all routes in the communication network.

A data-transfer-loading value could specify the remaining free transmission bandwidth of a particular link line, the proportion of total transmission bandwidth that is already occupied, or the current bit rate of the link line concerned, for example. Data-transfer-loading values can also be ascertained on a connection-specific, transfer-priority-specific, route-specific, originating-network-node-specific, and/or destination-network-node-specific basis. By ascertaining specific data-transfer-loading values such as these, it is possible to achieve highly individual distribution of the data-traffic load.

In order to ascertain the data-transfer-loading values, one or several, but preferably all of the network nodes in the communication network can send link-line-specific, route-specific, connection-specific and/or transfer-priority-specific loading information to the data-traffic-monitoring system, relating to the outgoing link lines, routes and connections of the network node concerned.

Based on the data-transfer-loading values specifically ascertained above, the data-traffic-monitoring system can ascertain appropriate connection-specific, transfer-priority-specific, route-specific, originating-network-node-specific and/or destination-network-node-specific distribution information, preferably for all the network nodes in the communication network.

In accordance with an advantageous embodiment of the invention, data-transfer-loading values previously ascertained to determine the distribution information and/or previously ascertained distribution information can be extrapolated relative to time. Using time-based extrapolation, distribution information can be adapted as effectively as possible to the traffic load expected at a later time.

The extrapolated data-transfer-loading values or distribution information can subsequently be compared to actual values ascertained at the extrapolated time. Depending on the degree of correspondence achieved, subsequent extrapolations can be modified or omitted, or a greater or lesser weighting can be applied to values extrapolated subsequently.

In accordance with a further advantageous embodiment of the invention, distribution information for a specific network node can include quota details, which specify for each of the alternative routes leading to a destination network node, what proportion of the data packets addressed to this destination network node should be transferred over the route concerned. At the same time, one of the quota details can be used to specify the proportion of data packets to discard e.g. in the event of an overload situation.

These quota details can also be used for weighting the random-number generator, which is used to assign data packets to one of the routes for onward transfer.

An embodiment of the invention is described in greater detail below, based on the diagram provided.

The schematic diagrams are as follows:

BRIEF DESCRIPTION OF THE DRAWINGS

FIG. 1 shows a communication network KN1, which links two subordinate communication networks KN2 and KN3. The communication network KN1 has an entry network node NK1 connected to communication network KN2, an exit network node NK4 connected to communication network KN3, a central network node ZNK operating as a data-traffic-monitoring system, and further network nodes NK2 and NK3. The network nodes NK1 to NK4 and ZNK in communication network KN1 are networked via link lines L1 to L6. In this configuration, link line L1 connects network nodes NK1 and NK2, link line L2 connects network nodes NK1 and NK3, link line L3 connects network nodes NK3 and ZNK, link line L4 connects network nodes ZNK and NK2, link line L5 connects network nodes NK4 and NK2, and link line L6 connects network nodes NK4 and ZNK.

Figure 1:
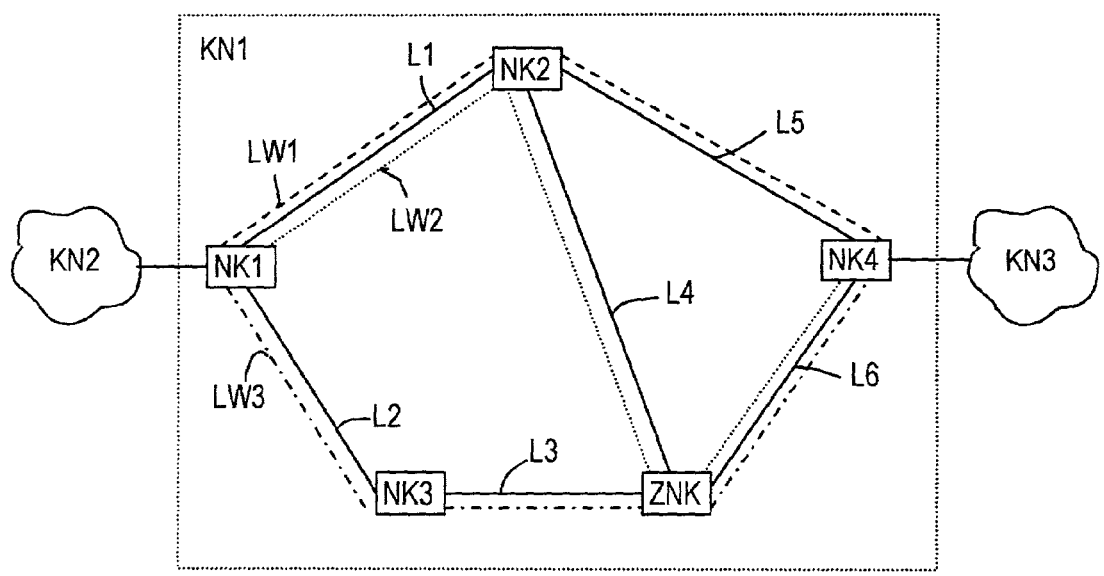
FIG. 1 shows a communication network linking two subordinate communication networks, with a number of alternative routes leading from an entry network node to an exit network node.

Each of the network nodes NK1 to NK4 and ZNK can send data packets to any other network node NK1 to NK4 and ZNK over a number of alternative routes in each case. For the sake of clarity, FIG. 1 only shows the example routes LW1, LW2 and LW3 leading from the entry network node NK1 to the exit network node NK4. In this case, route LW1 travels via link lines L1 and L5, route LW2 travels via link lines L1, L4 and L6, and route LW3 travels via link lines L2, L3 and L6.

In the present embodiment, it is assumed that data transfer is based on the Internet protocol (IP) in communication networks KN2 and KN3, and on the so-called MPLS protocol (multiprotocol label switching) in communication network KN1. As an alternative, communication network KN1 could be implemented as a so-called ATM network (asynchronous transfer mode), for example.

In order to transfer data packets over the routes LW1, LW2 and LW3, a connection can be established along each of these routes with the MPLS protocol, e.g. using a 'setup message'. These connections, often referred to as LSPs (label switched paths), can either be established in advance or only when required, for each route. In accordance with the MPLS protocol, each of the data packets sent over an LSP is given a 'label', which specifies the route to use.

Without restricting use of the invention in any way, the following example considers data transfers from originating terminal devices (not shown) in the communication network KN2 via the communication network KN1 to destination terminal devices (not shown) in the communication network KN3, based on end-to-end connections between the originating and destination terminal devices. The data to be transferred in this context is transported within IP data packets in the communication networks KN2 and KN3. Each of the IP data packets contains a destination IP address identifying at least one destination terminal device, and a source IP address identifying the originating terminal device concerned. The individual end-to-end connections also have different transfer priorities.

The IP data packets to be transferred within the end-to-end connections are transferred from communication network KN2 to the entry network node NK1. Based on the destination IP addresses contained in the IP data packet, entry network node NK1 determines a particular exit network node, NK4 in this case, to the relevant communication network, KN3 in this case, for a particular destination terminal device. The transfer priority of a particular end-to-end connection is also ascertained. The entry network node NK1 now has to distribute the IP data packets on the alternative routes LW1, LW2 and LW3 leading to the exit network node NK4, in such a way that transfer bottlenecks are largely avoided in communication network KN1, and so that the transfer resources of communication network KN1 are used as effectively as possible. If large numbers of terminal devices are connected to the communication networks KN2 or KN3, then a large number of end-to-end connections are no longer required on each of these routes or LSPs.

Figure 2:
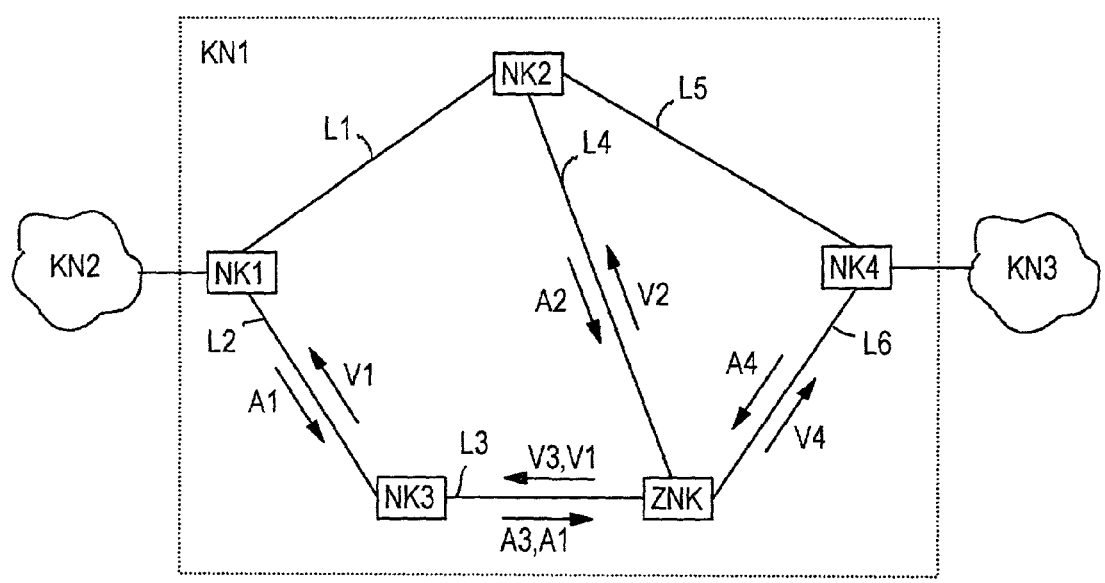
FIG. 2 shows the same communication network when data-transfer-loading values and distribution information are sent.

FIG. 2 shows the supply of information required to distribute the data packets. It shows the transfer of loading information A1 . . . A4 and distribution information V1 . . . V4 within communication network KN1.

The loading information A1 . . . A4 depicts the current loading situation within the communication network, and is sent from network nodes NK1 . . . NK4 to the central network node ZNK at regular intervals. For this purpose, the relevant network node NK1 . . . NK4 periodically ascertains the transmission bandwidth currently occupied on each of its outgoing link lines. Alternatively, link-line-specific bandwidth occupancy could also be determined separately for all transfer priorities and/or routes. The transmission bandwidths ascertained by any of the network nodes NK1 . . . NK4 are summarized in the form of loading information A1 . . . A4 and then sent to the central network node ZNK.

Based on the loading information A1 . . . A4 received by the central network node ZNK, it then determines network-node-specific distribution information V1 . . . V4 for each of the network nodes NK1 . . . NK4, and sends this to the corresponding nodes. The distribution information V1 . . . V4 for network nodes NK1 . . . NK4 contains quota details for each destination network node in communication network KN1 that can be reached from these network nodes. For each of the routes leading to a destination network node, these quota details specify the proportion of data packets addressed to this destination network node that should be transferred over the route concerned. The distribution information can also contain quota details that specify what proportion of the data packets addressed to a particular destination network node should be discarded, e.g. in the event of an overload situation. These quota details are subsequently referred to as the discard quota.

Figure 3:
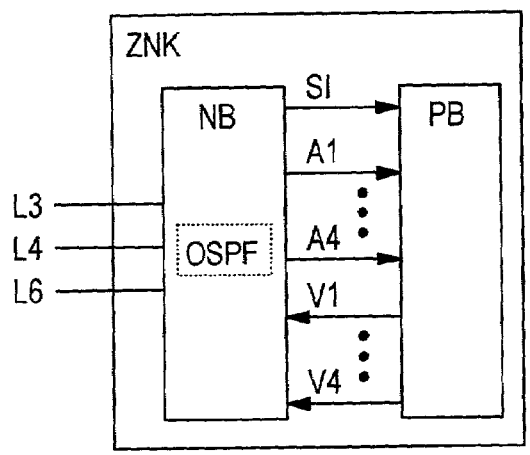
FIG. 3 shows a schematic diagram of a central network node in the communication network operating as a data-traffic-monitoring system.

FIG. 3 shows a schematic diagram of the central network node ZNK. The functional components represent a network module NB connected to link lines L3, L4 and L6, and a processor module PB attached to the network module NB. The so-called OSPF routing protocol (open shortest path first) is implemented in the network module NB. In an alternative configuration, the so-called PNNI protocol (private network to network interface) can also be used as a routing protocol.

The central network node ZNK uses the OSPF routing protocol to extract structure information SI from communication network KN1, where the structure information SI describes the complete data transmission structure of communication network KN1. In particular, the structure information SI describes all the routes leading from any first network node NK1 . . . NK4 or ZNK to any second network node NK1 . . . NK4 or ZNK, and the maximum transmission bandwidth on each of the link lines L1 . . . L6 in the communication network KN1. If applicable, this information can also be captured on a transfer-priority-specific basis. The captured structure information SI is sent from the network module NB to the processor module PB.

Furthermore, the loading information A1 . . . A4 received at regular intervals is forwarded to the processor module PB by the network module NB. Based on the maximum transmission bandwidths contained in the structure information SI, the processor module PB initially converts the bandwidth occupancy details contained in the loading information A1 . . . A4 into data-transfer-loading values. These define the total remaining free transmission capacity for each of the link lines L1 . . . L6, on a transfer-priority-specific basis if applicable.

The data-transfer-loading values thus determined are extrapolated relative to time, also using previously determined data-transfer-loading values, in order to obtain estimated values for the loading situation at a future time. This provides advance information and therefore allows highly efficient control of data traffic.

Using all of the data-transfer-loading values, the processor module PB then calculates the distribution information V1 . . . V4 for each of the individual network nodes NK1 ... NK4. Distribution information is similarly ascertained for the central network node ZNK itself (not shown). The distribution information V1 ... V4 that has been ascertained is transferred from the processor module PB to the network module NB, and sent from there to each of the corresponding network nodes NK1 ... NK4 at regular intervals.

The distribution information V1 ... V4 is determined in such a way that the data streams of all the network nodes NK1 ... NK4 and ZNK, which are divided as per the distribution information, are distributed in their totality over the individual link lines L1 ... L6, so that any remaining free transmission bandwidth in each case is used as effectively as possible and transfer bottlenecks are avoided.

If the totality of data streams on one of the link lines L1 ... L6 exceeds the maximum transmission capacity of the link line concerned, then the affected network node in each case is sent distribution information with a network-node-specific discard quota. The discard quota sent to one of these network nodes is generally proportionate in each case to the bandwidth quota that this network node occupies on the overloaded link line. The discard quotas are calculated so that the remaining data streams do not exceed the maximum transmission bandwidths of the link lines L1 ... L6. The discard quotas can also be determined on a transfer-priority-specific basis. In this case, higher discard quotas are defined for data streams with a low priority than for data streams with a high transfer priority.

In the case of a transmission situation that specifically affects one of the network nodes NK1 ... NK4, e.g. the failure of a link line or a subsequent network node, the processor module PB can also specify one or more new routes for this network node. In this case, route information describing the new routes is sent to the network node concerned.

Figure 4:
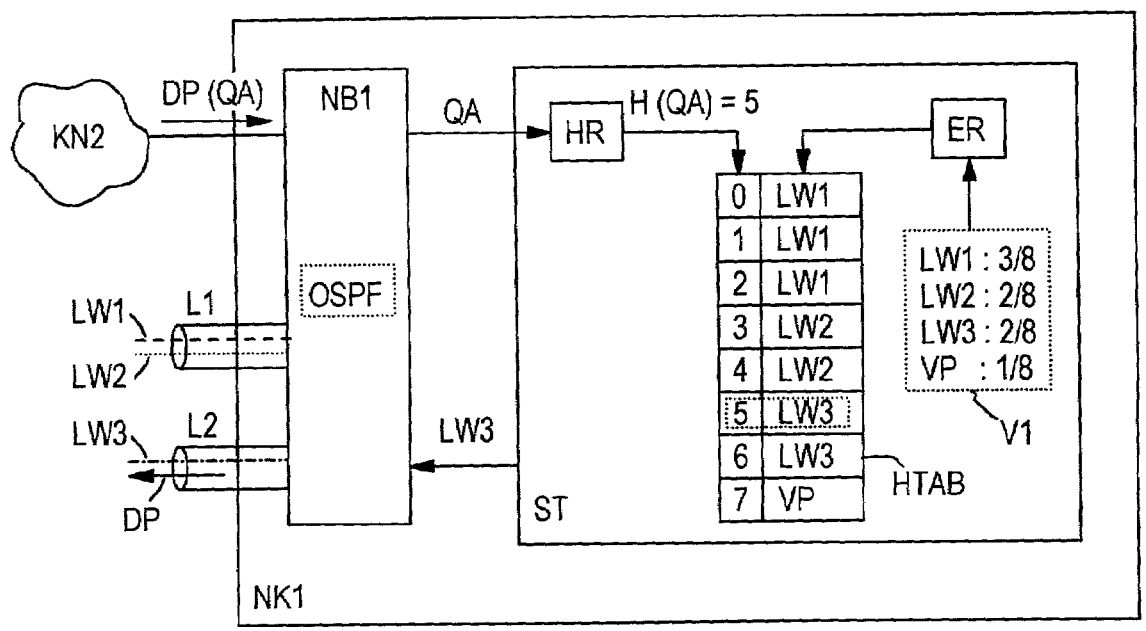
FIG. 4 shows a schematic diagram of the entry network node.

FIG. 4 shows a schematic diagram of the entry network node NK1 in detailed format. Its functional components are a network module NB1, to which communication network KN2 and link lines L1 and L2 are connected, and a control unit ST that is coupled to the network module NB1. As shown in FIG. 1, routes LW1 and LW2 travel over link line L1, and route LW3 travels over link line L2. The OSPF protocol is implemented in the network module NB1. In an alternative configuration, the PNNI protocol can also be used.

The distribution information V1 that was most recently sent to the network node NK1 is stored in the control unit ST. This includes quota details, which specify the proportion of data packets to be transmitted over the route concerned, for each of the routes LW1, LW2 and LW3 leading to the exit network node NK4. Furthermore, the distribution information V1 contains a discard quota, which specifies what proportion of the data packets should be assigned to a discard path VP, i.e. what proportion of the data packets to discard. In the present embodiment, it is assumed that, based on the quota details, ⅜ of the data packets are assigned to the route LW1, ⅖ of the data packets are assigned to the routes LW2 and LW3 respectively, and ⅛ of the data packets is assigned to the discard path VP.

The distribution of IP data packets originating from communication network KN2 and destined for the exit network node NK4 is described below, using the transmission of a single IP data packet DP as an example.

When an IP data packet DP originating from the communication network KN2 arrives, the network module NB1 first checks its destination IP address, in order to determine a relevant exit network node, NK4 in this case. The network module NB1 also extracts the source IP address QA of the data packet DP and sends it to the control unit ST.

An allocation routine ER and a so-called hash routine HR are implemented in the control unit ST. Both of these routines can access a so-called hash table HTAB stored in the control unit ST. The allocation routine ER uses the quota details in the distribution information V1 to generate an assignment of address classes 0 ... 7 to the routes LW1, LW2, LW3 and the discard path VP, corresponding to these quota details.

The assignment is stored in the hash table HTAB. In the present embodiment, address classes 0, 1 and 2 are assigned to route LW1, address classes 3 and 4 are assigned to route LW2, address classes 5 and 6 are assigned to route LW3, and address class 7 is assigned to the discard path VP.

The hash routine HR can generate a so-called hash value from address information, e.g. the source IP address QA. This hash value allows the address information to be divided into address classes. In order to generate a hash value from address information, individual bits from the address information can be combined with each other or with other fixed bit patterns. This is intended to ensure that hash values derived from different address information are distributed as evenly as possible in statistical terms, so that the distribution of address information to address classes is as uniform as possible. In the following case, the hash routine HR maps ad-hoc address information onto respective hash values in the range 0 to 7, which themselves represent the individual address classes 0 ... 7. Due to the almost uniform distribution of address information to address classes, the proportional assignment of address classes 0 ... 7 to routes gives an assignment of data packets to routes that is in accordance with the distribution information V1.

In the present embodiment, the source IP address QA of the data packet DP is mapped onto the hash value 5 by the hash routine HR, and therefore assigned to address class 5. Using the hash table HTAB, the control unit ST then determines the route LW3 as the route assigned to address class 5, and sends an information message to network module NB1 accordingly to identify this route. As per the MPLS protocol, network module NB1 gives a 'label' to the IP data packet DP, specifying the route LW3. The network module NB1 then sends the IP data packet DP, embedded in an MPLS data packet, into the communication network KN1 via the link line L2. The communication network KN1 transfers the MPLS data packet via the route LW3, as specified by its 'label', to the exit network node NK4, which extracts the IP data packet DP from the MPLS data packet and sends it into the communication network KN3.

The invention claimed is:

1. A method for distributing data traffic on a communication network comprised of network nodes connected via at least one link line, the method comprising:
   sending, to a data traffic monitoring system, loading information that is link-line-specific or route-specific;
   ascertaining, in the data traffic monitoring system, a current data transfer loading value for a link line or for a network node using the loading information;
   determining, in the data traffic monitoring system, distribution information for the network node based on the current data transfer loading value;
   sending the distribution information to the network node;
   generating, in the network node, an allocation model used to divide address information of data packets into separate address classes that correspond to a plurality of alternative routes leading to a destination network node, the allocation model being generated based on the distribution information;

ascertaining, in the network node, an address class from address information for a data packet addressed to the destination network node; and sending the data packet, from the network node, via one of the alternative routes that corresponds to the address class for the data packet addressed to the destination network node.

2. The method of claim 1, wherein the current data transfer loading value is ascertained based on a routing protocol in the communication network.

3. The method of claim 1, further comprising:
transferring data packets having different transfer priorities over the communication network; and
sending, to the data traffic monitoring system, loading information that is transfer-priority-specific;
wherein the current data transfer loading value is ascertained based on the loading information that is transfer-priority-specific.

4. The method of claim 1, wherein the distribution information is transfer-priority-specific; and
wherein the network node sends data packets in accordance with a transfer priority of the distribution information.

5. The method of claim 3, further comprising:
determining, in the data traffic monitoring system, destination network node distribution information for the network node; and
sending the destination network node distribution information to the network node.

6. The method of claim 1, further comprising:
determining distribution information over time by extrapolating at least one previously ascertained data transfer loading value or previously ascertained distribution information.

7. The method of claim 1, wherein the distribution information for the network node comprises quota details that specify, for each route in a group of alternative routes leading from the network node to the destination network node, a proportion of data packets addressed to the destination network node that is transferred over one of the alternative routes.

8. The method of claim 7 further comprising:
using a random number generator weighted in accordance with quota details to assign data packet addressed to the destination network node to one of the alternative routes.

9. The method of claim 1, wherein the address information comprises source address information that identifies a sender of the data packet.

10. The method of claim 1, further comprising:
in the network node, allocating address classes based on stored address information from data packets that were transmitted previously.

11. The method of claim 1, further comprising:
determining, in the data traffic monitoring system, one of the alternative routes for the network node based on the data transfer loading value; and
sending route information describing the one of the alternative routes to the network node.

12. A communication network comprising:
a plurality of network nodes connected via link lines, comprising:
an allocation facility for creating an allocation model based on distribution information, and for dividing address information of data packets into separate address classes, each address class being assigned to one of a number of alternative routes leading to a destination network node; and
a data packet distribution facility for ascertaining an address class for address information of a data packet to be transferred, and for transferring the data packet via a route assigned to the address class; and
a data-traffic-monitoring system comprising:
an information-capture facility for ascertaining a current data transfer loading value for link lines or a network node;
an analysis facility for determining distribution information for the network node based on the data transfer loading value; and
a transmission facility to send the distribution information to the network node.

* * * * *